ized Patent [19]

United States Patent [19]
Sletten

[11] 3,844,008
[45] Oct. 29, 1974

[54] CUTTING TOOL
[75] Inventor: Terry L. Sletten, Westland, Mich.
[73] Assignee: The Valeron Corporation, (Detroit) Oak Park, Mich.
[22] Filed: Mar. 14, 1973
[21] Appl. No.: 341,095

[52] U.S. Cl. .................................................. 29/96
[51] Int. Cl. ............................................. B26d 1/00
[58] Field of Search ......................... 29/96; 82/36 R

[56] References Cited
UNITED STATES PATENTS
| | | | |
|---|---|---|---|
| 2,846,756 | 8/1958 | Novbov | 29/96 |
| 2,875,662 | 3/1959 | Poorman | 82/36 R |
| 3,220,089 | 11/1965 | Hammers | 29/96 |
| 3,500,522 | 3/1970 | Stier | 29/96 |
| 3,543,363 | 12/1970 | Diemond | 29/96 |

FOREIGN PATENTS OR APPLICATIONS
989,133   4/1965   Great Britain ......................... 29/96
1,204,054   1/1960   France ................................. 29/96

Primary Examiner—Leonidas Vlachos
Attorney, Agent, or Firm—Farley, Forster and Farley

[57] ABSTRACT

The invention comprises a cut off and grooving tool of substantially simplified construction which provides increased versatility and rigidity in using disposable cutting inserts. A vertical slot and key attachment means between tool body and insert locating member provides a more rigid tool and more accuracy in locating the cutting edge. The simplified construction allows a single tool body or shank to accommodate a variety of different insert widths in several different cutting positions.

13 Claims, 5 Drawing Figures

PATENTED OCT 29 1974 3,844,008

CUTTING TOOL

BACKGROUND OF THE INVENTION

Typical available disposable insert cut off and grooving tools for slotting and cutting off parts held in a rotating chuck as on a lathe are shown in U.S. Pat. Nos. 2,846,756; 3,534,457; and 3,543,363. Most prior art tools use a narrow, flat, insert supporting blade which is mounted in a longitudinal slot in the tool body. A separate clamping member is positioned over the insert, generally in a second slot in the tool body. Such constructions involve removing a significant amount of material from the working end of the tool shank which sacrifices rigidity in the area which absorbs most of the cutting forces. In addition, most prior art tool shanks have two or more tapped holes near the end for securing the support blade and clamp which further sacrifice rigidity and complicate manufacture. The longitudinal slots are subject to damage in the event of a machine accident.

Existing toolholders are also limited to a single width of insert and a single cutting position. This is primarily due to design features which preclude having alternate insert locating positions on a single shank.

SUMMARY OF THE INVENTION

The present invention provides an insert locating member which includes an integral rectangular boss or key projecting laterally from the side thereof having both vertical and horizontal locating edges. The key is accurately formed to fit one of several matching slots formed in the tool body. A single screw fixes the insert locating member to the tool body with the interengagement of the key and slot.

The invention includes the use of a one-piece insert locating member having a clamping portion thereof sufficiently flexible relative to the remaining main insert support and attachment portion that it may be tightened down with a clamp screw to tightly secure a cutting insert in position. In this form each insert locating member retains an insert tightly in cutting position without interaction with any portion of the tool body. Therefore, different locating members for a variety of insert widths and geometries may be stocked at minimum expense to the user and simply interchangeably mounted on a single shank to perform a variety of operations. In addition, accurate locating surfaces allow use of the toolholder on numerically controlled machines. Tools may be changed without removing the shank from the carriage or turret and the vertical slot allows tool change with minimum backing off of the carriage from the work.

DESCRIPTION OF THE PREFERRED EMBODIMENT

Figure 1:
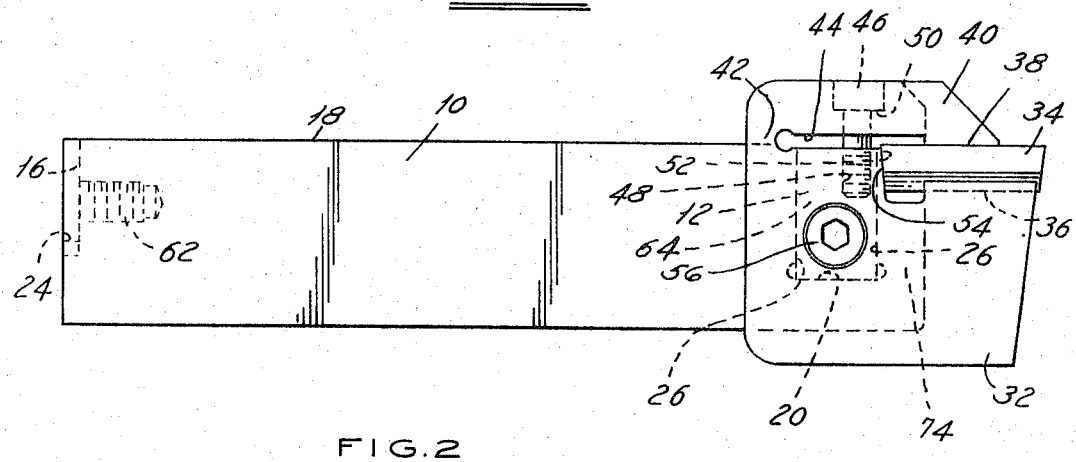
FIG. 1 is a side view of the cutting tool.
Figure 2:
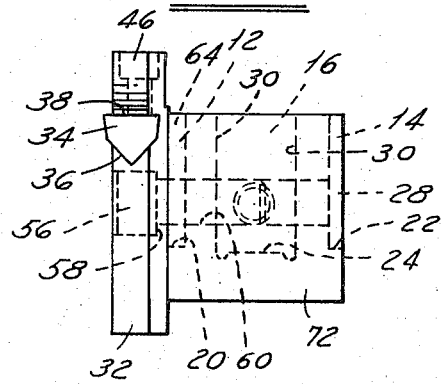
FIG. 2 is an end view of the cutting tool.

Referring to FIG. 1 the tool body 10 has transverse rectangular slots 12, 14 and 16 formed in opposite side walls and an end wall respectively as shown. The slots extend vertically downward from the top 18 of the tool body 10 and terminate with end walls 20, 22 and 24 respectively as shown. The end walls 20, 22 and 24 may be of any convenient shape but must be accurately positioned as they serve to vertically locate the cutting edge of the insert. The side walls 26, 28 and 30 respectively of each slot are parallel to each other and are constructed to longitudinally locate the cutting edge and receive cutting forces transmitted through the insert locating member 32. The slots are accurately manufactured in a conventional manner.

The insert locating member 32 is adapted to retain a disposable cutting insert 34 in locating means comprising a slot having a V-shaped lower support surface 36 and flat upper clamping surface 38. A clamp portion 40 of the insert locating member 32 integrally joins the remaining portion of the insert locating member at a narrow neck 42 at the rear of slot 44 in the insert locating member. The narrow neck 42 provides sufficient flexibility to allow the clamping surface 38 to be pulled down against the cutting insert 34 by tightening of a standard Allen head screw 46 which engages a threaded bore 48 in the lower portion of the locating member 32. The head of the screw 46 is located in a countersunk hole 50 in the clamp portion 40 of the locating member.

The locating member 32 preferably includes a backup wall 52 positioned to contact the rearward end 54 of the cutting bit 34, thereby providing accurate longitudinal location for the cutting edge of the insert 34. The wall 52 is constructed to contact the insert below its top surface to allow for the use of reversible inserts.

The locating member 32 includes an integral boss or key 64 which engages the slot 12. While, as shown in FIG. 1, the boss 64 extends from the right side of the locating member, the boss may optionally extend from the other side of the locating member for engagement of the locating member 32 with the slot 14. Either the right handed or left handed version of the locating member 32 may optionally be positioned in the slot 16 at the end of the tool body 10. The tool body, being of rectangular cross section, may also be rotated to allow inverted cutting.

Figure 3:
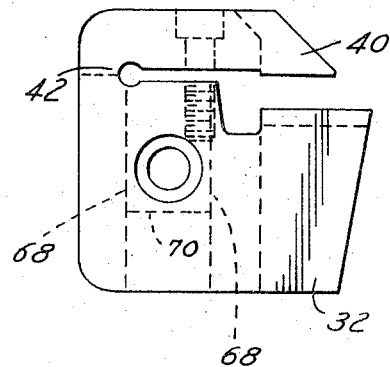
FIG. 3 is a side view of the clamping member.
Figure 4:
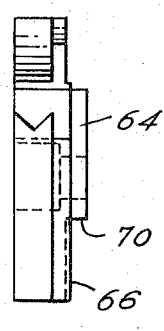
FIG. 4 is an end view of the clamping member; and,
FIG. 5 is a top view of the clamping member.
Figure 5:
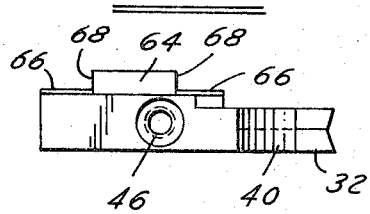

As is shown in FIGS. 3 through 5, the rectangular boss 64 extends from a planar side surface 66 of the insert member. The key 64 projects slightly less than the depth of the slot 12. The surface 66 is accurately formed such as by grinding and tightly engages a corresponding planar side surface on the body 10 adjacent to the slot 12. The engaging planar surfaces accurately laterally locate the cutting edge and give support along the entire front area 74 which prevents lateral deflection. The parallel edge walls 68 and bottom edge wall 70 of the key 64 are likewise accurately formed such as by grinding to provide a close, rigidly interengaging fit with tne end wall 20 and side walls 26 of the slot 12 or the corresponding walls of the slots 14 and 16.

The locating member 32 is attached to the tool body 10 by a single standard Allen head screw 56 engaging a shoulder bore 58 in the locating member. The bore in the locating member through which the screw 56 extends is slightly larger than the screw to allow the member to locate on the walls of the slot. The screw 56 engages a single threaded hole 60 which extends through the tool body 10 in communication with both of the slots 12 and 14. This allows locating members to be mounted on either side of the body using a single threaded through hole, which simplifies manufacture of the tool body. An additional threaded hole 62 is provided for the end slot 16.

The particular configuration of the locating member 32 allows economical casting of the element and reduces the finishing operations to the grinding of the locating surfaces such as 66, 68 and 70 as well as 36, 38 and 52. Machining operations are limited to forming the insert locating surface and drilling and tapping the screw holes. Thus, the configuration is extremely simple to manufacture in comparison with the known prior art.

The tool holder according to this invention provides greater strength and rigidity at the front end of the tool body where needed most. Only a minimum amount of metal is removed from the body in providing the slots and screw hole. This leaves the maximum amount of metal in the area 74 for resisting the major cutting forces and torque arising from cantilevered application of cutting pressure. Also, the vertical key and slot connection provides reaction to cutting forces at a point closer to the cutting insert. The overall structure is superior in strength and resistance to deflection relative to prior art longitudinal slot configurations and, in addition, has a simplified geometric configuration.

Different insert locating members may be stocked for different widths of inserts, eliminating the need to stock a different tool holder for each job. When using a thin insert for narrow cuts the separable insert locating member may be constructed with the portion below the insert extending well below the bottom of the tool body 10 to give additional support and rigidity.

The portion of the locating member 32 which extends beyond the end of the tool body is preferably constructed thinner than the remainder of the member and spaced outwardly from the planar locating surface. This gives added strength to the locating member and allows inserts wider than the extending portion to be used without relieving the tool body. Also, by making the portion of the locating member which overlaps the tool body thicker, the clamp screw 46 and threaded hole 48 can be larger and will provide greater holding force for the insert.

Toolholders according to this invention have successfully been used to cut 8620, 4140 and 52100 steel under a variety of cutting conditions. In tests comparing the present toolholder with a commercially available holder under the same machining conditions, the present holder allowed feed rates to be increased by about 25 per cent.

Toolholders according to the present invention can be constructed with the end slot on the same end of the tool as the opposing slots. With three slots a single tool body can be used for right or left hand I.D. or O.D. machining. The separable locating member may also be made for positive rake positioning of the insert. The vertical slot and key are not subject to damage if the holder is accidently fed too far in the workpiece.

I claim:

1. A cutting tool comprising:
   a tool body,
   a cutting insert locating member including an insert supporting surface extending beyond an end of said body, clamp means for clamping an insert in position against said insert supporting surface,
   interengaging positioning means on overlapping sides of said insert locating member and said body, said positioning means including a key having a pair of parallel locating walls extending generally normal to said insert supporting surface,
   interengaging planar locating and supporting surfaces at the lateral interface between said body and insert locating member, adjacent said positioning means, and
   means for securing said insert locating member to said body with said positioning means and planar surfaces in engagement.

2. The cutting tool of claim 1 wherein the clamp means is mounted on the insert locating member.

3. The cutting tool of claim 1 wherein the clamp means includes a clamp portion integral with the insert locating member, and means carried by the insert locating member for drawing the clamp portion into locking engagement with the insert.

4. The cutting tool of claim 1 wherein said insert supporting surface is a V-shaped groove formed in the insert locating member.

5. The cutting tool of claim 1 wherein said body includes at least two alternate positioning means located on opposite sides of said body.

6. The cutting tool of claim 5 wherein a single threaded bore hole communicates between the two positioning means.

7. The cutting tool of claim 5 including a third alternate positioning means formed at an end of said body.

8. The cutting tool of claim 1 wherein a portion of the insert locating member which extends beyond an end of said body is thinner than the remainder of the member and is spaced laterally from the planar locating surfaces.

9. The cutting tool of claim 1 wherein said insert locating member includes a back wall for accurately locating the longitudinal insert positions.

10. A cutting tool comprising,
    a tool body,
    a cutting insert locating member including an insert supporting surface extending beyond an end of said body, clamp means integral with said insert locating member for clamping an insert in position against said insert supporting surface, screw means engaging said clamp means and said insert locating member adapted to actuate said clamp means,
    interengaging positioning means on overlapping sides of said insert locating member and said body, said positioning means including a key having a pair of parallel locating walls extending generally normal to said insert supporting surface,
    interengaging planar locating and supporting surfaces at the lateral interface between said body and insert locating member adjacent said positioning means, and
    means for securing said insert locating member to said body with said positioning means and planar surfaces in engagement.

11. The cutting tool of claim 10 wherein a portion of the insert locating member which extends beyond an end of said body is thinner than the remainder of the member and is spaced laterally from the planar locating surfaces.

12. The cutting tool of claim 1 wherein said positioning means includes a third locating wall disposed normal to said pair of parallel locating walls.

13. A cutting tool comprising,
a tool body,
a cutting insert locating member including an insert supporting surface extending beyond an end of said body, clamp means for clamping an insert in position against said insert supporting surface,
interengaging rectangular key positioning means on overlapping sides of said insert locating member and said body, said positioning means including both parallel and normally disposed locating walls spaced from the end of said body providing interengaging registration with at least three key walls to both positively locate and resist torque incident to cantilevered cutting pressure,
interengaging planar locating and supporting surfaces at the lateral interface between said body and insert locating member, adjacent said positioning means, and
means for securing said insert locating member to said body with said locating walls and surfaces in engagement.

* * * * *